July 18, 1961        J. R. ESHER, JR        2,993,121

CLOSURE TIME COMPUTER

Filed Dec. 18, 1953

INVENTOR.
JOSEPH ROBERT ESHER, JR.

BY Wade Koontz
AND Herold H. Losche
ATTORNEYS

United States Patent Office 2,993,121
Patented July 18, 1961

2,993,121
CLOSURE TIME COMPUTER
Joseph Robert Esher, Jr., Schenectady, N.Y., assignor to the United States of America as represented by the Secretary of the Air Force
Filed Dec. 18, 1953, Ser. No. 399,182
7 Claims. (Cl. 250—83.3)

This invention relates to a passive means for computing the approximate time that it will take for one body to collide with another body where one of the bodies is an infrared emitting source and is approaching the other body, this time required for collision being referred to herein as the closure time.

While this invention has many applications, it is of great importance to the defense arm of the nation in time of war to have ships, aircraft, and other movable or stationary defense stations equipped to make immediate and continuous evaluations of approaching dangerous enemy devices radiating infrared rays. The present invention presents a passive closure time computer from which immediate and continuous closure time approximations are indicated of approaching infrared radiating bodies.

In this invention a photoconductive cell, as a lead sulfide cell, is used to pick up infrared radiations. It has been found that the closure time depends only upon the received infrared energy and the rate of change of the received energy. More particularly, the closure time can be readily calculated from the voltage developed in the photoconductive cell which voltage is proportional to the received energy and the differential of the logarithm of that voltage will provide a direct current voltage readily applicable to a voltage responsive device calibrated in time. The received infrared energy in the photoconductive cell is transformed into electrical energy which is passed through a logarithmic amplifier and a differentiating network to drive a potential responsive device calibrated in time to indicate the closure time of an approaching body or of a station carrying the computer approaching a target. It is therefore an object of this invention to provide a passive infrared closure time computer for making immediate and continuous closure time evaluations of approaching or approached infrared radiating bodies.

These and other objects, advantages, features and uses will become more apparent as the description proceeds when considered in conjunction with the accompanying drawing, in which.

The invention can best be understood by considering the mathematical theory forming the basis of the invention. The infrared energy emitted by any infrared source and received at the detector after transmission through a low absorption window in the atmosphere may be expressed by:

(1) $$W = \frac{K}{R^2}$$

where W is the energy received by the detector; K is assumed to be a constant involving target temperature, size, and atmospheric attenuation; and R is the range of the target. Differentiating Equation 1 with respect to time it becomes, (2) $$\frac{dW}{dt} = \frac{-2K}{R^3} \frac{dR}{dt}$$

Substituting the value of K in Equation 2 from Equation 1 wherein $K = WR^2$, (3) $$\frac{dW}{dt} = \frac{-2W}{R} \frac{dR}{dt}$$

Since closure time, $T_c$, is the negative of range divided by the range rate, or (4) $$T_c = \frac{-R}{\frac{dR}{dt}}$$

it may be substituted in Equation 3 to obtain, (5) $$\frac{dW}{dt} = \frac{2W}{T_c}$$

or $$T_c = \frac{2W}{\frac{dW}{dt}}$$

Inasmuch as the natural logarithm of a number is equal to the log of that number to the base $e$ ($e = 2.7183$) or, (6) $\ln W = \log_e W$, it can be written, (7) $$d \ln W = \frac{dW}{W}$$

or $$\frac{dW}{dt} = \frac{d}{dt}(\ln W) W$$

Substituting Equation 7 into Equation 5 it becomes, (8) $$T_c = \frac{2}{\frac{d}{dt}(\ln W)}$$

From Equation 8 it is seen that if a voltage is developed proportional to the received energy and the logarithm of that voltage is differentiated, the closure time may be determined. It is important to note that in Equation 8 the closure time is independent of the constant K. This invention provides a circuit means for physically performing the mathematical operation arrived at in Equation 8.

Figure 1:
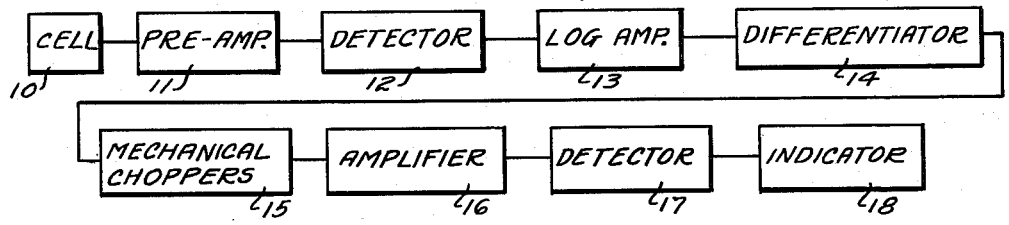
FIG. 1 is a block diagram of the circuit used in this invention.

Referring now to FIG. 1, there is shown a block diagram wherein a photoconductive cell, as a lead sulfide cell, is illustrated at 10. The cell has an alternating potential impressed thereon, as is well known in the art, which varies in accordance with changes in resistance caused by infrared radiations. The electrical output of the cell 10 is passed through a preamplifier 11 of one or more stages, as necessary or desired. The preamplifier is coupled to a detector 12 which is coupled to a logarithmic amplifier 13. The output of the logarithmic amplifier is passed through a differentiating network 14 and a mechanical chopper 15 to an amplifier 16. The amplified signal is rectified in a detector 17 and passed to a potential responsive device 18, as a vacuum tube volt meter, or the like, which has a time scale thereon calibrated to give direct closure time readings in seconds.

Figure 2:
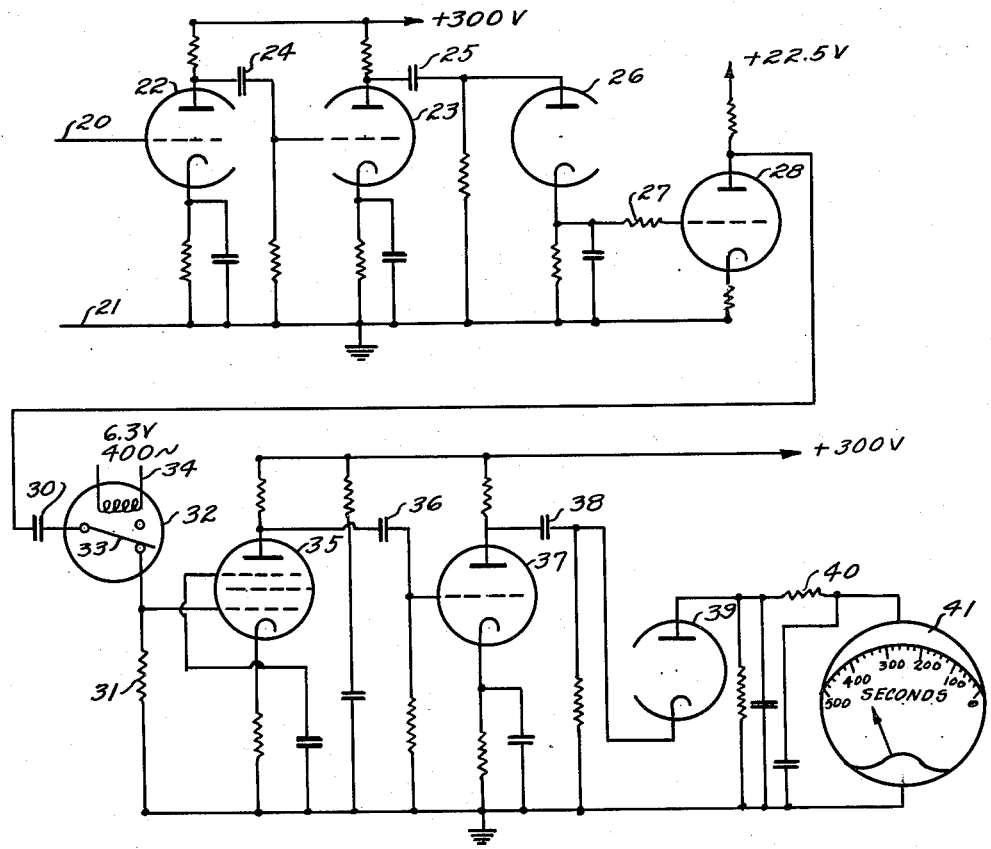
FIG. 2 is a detailed circuit diagram carrying out the invention.

The principal part of the block diagram of FIG. 1 is shown in circuit detail in FIG. 2. The voltage signal from the cell 10 is amplified in the conventional preamplifier of as many stages as is considered necessary. The input to the last preamplifier from the cell 10 and preceding preamplifiers comes by leads 20 and 21, the lead 20 being connected to the grid of the last preamplifier and the lead 21 being connected to ground and the cathode circuit thereof. The last preamplifier may consist of a double triode tube 22 and 23 as a 6SN7, the anode of the first section of the triode 22 being connected through a condenser 24 to the grid of the second triode section 23. The preamplifier should have a gain of approximately 100 and the frequency response should be flat from approximately 30 cycles per second to 300 cycles per second. The bandpass of the preamplifier is somewhat limited in order to increase the signal-to-noise ratio of the system. The anode of the last section of the preamplifier is coupled through a condenser 25 to the anode of a peak detector 26 the output at the cathode of which is a positive direct current (D.C.) voltage proportional to the peak amplitude of the input voltage. The detector may be one half of a double diode as a 6H6 tube or a single tube as desired. The cathode of the peak detector is coupled through a resistance 27 to the grid of a logarithmic amplifier tube 28 on which the output voltage of the peak detector cathode is impressed producing an output voltage at the anode of the logarithmic amplifier 28 proportional to the logarithm of the applied voltage.

The output voltage of the logarithmic amplifier 28 is then differentiated by a simple resistance-capacitance (RC) network. While it is understood that an RC differentiator network does not perform a perfect differentiation since it has an error term in its output which is the rate of change of the output voltage of the differentiator, this error does not exceed 3% and is quite tolerable for the passive closure time system. This error has also been found to remain substantially constant for various target speeds. The major disadvantage of using an RC differentiator in this system is that the output voltage is very small since it is differentiating a slowly increasing D.C. voltgae. The output of the differentiator varies from approximately 5 to 30 millivolts over the range of closure time from 100 to 10 seconds. These small output voltages must be amplified to be useful yet D.C. amplifiers are impractical for the reason that a very high degree of drift compensation is required for amplification. It was found that a low noise level mechanical chopper was satisfactory for the purpose of preparing the low level D.C. voltages from the differentiator for amplification by conventional amplifiers. The differentiator network is shown by the capacitor element 30 and the resistance element 31 connected in the anode output of the logarithmic amplifier 28 with the mechanical chopper 32 in the circuit between these elements. The chopper is preferably of a type having a switch blade 33 therein for making and breaking the circuit between the elements 30 and 31 of the differentiator network. The switch blade is under the magnetic influence of a coil 34 which is connected to a low voltage, high frequency source, as for example a 6 volt, 400 cycle electrical energy to cause vibration of the switch arm. In this example the output of the differentiator circuit is thus chopped at a 400 cycle rate.

The output of the differentiator network is connected to the control grid in the first tube 35 of a broad band amplifier having a gain of approximately 4000. The tube 35 may be of a 6SJ7 type having the suppressor grid thereof connected in the conventional manner and the anode thereof coupled through a condenser 36 to the grid of a triode tube 37. The output of this amplifier circuit at the anode of the triode tube 37 is a square wave having a peak voltage inversely proportional to closure time. This amplifier output is applied through condenser 38 to the cathode of a peak detector tube 39 which may, if desired, be the other half of the 6H6 tube 26. The output at the anode of the peak detector 39 is also inversely proportional to closure time and is fed through a resistor 40 to a suitable voltage responsive closure time indicating device which in the present illustration may be a vacuum tube volt meter 41 calibrated in seconds of time.

In the operation of the device the closure time computer is positioned where the approach of, or the approach to, infrared targets is expected as, for example, in an aircraft where the cell 10 is used in a target tracking or searching system, or the like. An approaching infrared emitting target, for example, focused into the cell 10 will produce a voltage proportional to the received energy. As described above the closure time is computed by differentiating the logarithm of the received voltage or energy. The logarithmic amplifier and the differentiating network are of primary importance in the system in computing the closure time on the indicator 41 since they carry out the mathematical operations of Equation 8. The closure time computer gives continuous data or indications of the approach of the target in seconds of time whereby the aircraft personnel carrying the device can at any time immediately evaluate the target situation and take action accordingly.

It is realized that a number of factors introduces errors in the computed time indications such as atmospheric scattering of the radiated energy and changes in target aspect, but these errors are tolerable for a continuous passive closure time computer system. Such errors could be as much as 20 percent without harming the utility of this device and it has been found that errors of less than 20% have developed in the device described. An interference filter may be used in the cell 10 to improve the accuracy of the system, where desired, although extreme accuracy is not essential to the function or usefulness of the device.

While many modifications and changes may be made in the constructional details of this invention without departing from the spirit and scope thereof, it is to be understood that I desire to be limited only in the scope of the appended claims.

I claim:

1. A passive infrared closure time computer comprising, an infrared detecting means, means for amplifying the detected signal of said infrared detecting means logarithmically, and means for differentiating the logarithmic amplified signal providing a signal voltage output inversely proportional to the closure time of an infrared emitting source and the infrared detecting means.

2. A passive infrared closure time computer comprising, an infrared photoconductive means, means coupled to said photoconductive means for producing a direct current potential proportional to the logarithm of the voltage of said photoconductive means, and means coupled to the last-mentioned means for differentiating the voltage output therefrom whereby said voltage output from said differentiating means is inversely proportional to the closure time of said photoconductive means and an approaching infrared emitting source.

3. A passive infrared closure time computer comprising; an infrared photoconductive cell for producing voltage signals upon receiving infrared radiations; a circuit coupling said photoconductive cell to a voltage responsive device calibrated in a time scale; and a logarithmic amplifier and a differentiating network in said circuit, said logarithmic amplifier producing in its output amplified voltages proportional to the logarithm of the voltage signals of said cell and said differentiating network producing voltages of a value equal to the mathematical differential of the voltage outputs of said logarithmic amplifier whereby the closure time is indicated on said voltage responsive device of an approaching infrared emitting source having its radiations falling on said cell.

4. A passive infrared closure time computer comprising, an infrared photoconductive cell for producing voltage signals upon receiving infrared radiations, detector means coupled to said cell for detecting the voltage signals produced by said cell, a logarithmic amplifier connected to said detector means for producing a logarithmic amplification of the detected voltage signals, a differentiating network coupled to said logarithmic amplifier for differentiating the logarithmically amplified voltage signals, and means coupling a voltage responsive indicator to said differentiating network for indicating the differentiated output voltages of said differentiating network, said indicator being calibrated in time whereby the closure time of an infrared emitting source approaching said cell causing voltage signals at the output of said differentiating network is indicated continuously on said indicator.

5. A passive infrared closure time computer as set forth in claim 4 wherein said means coupling a voltage responsive indicator to said differentiating network includes a circuit chopping means and a detector for interrupting the differentiated output voltage signals and for detecting the peak voltage signals for driving said voltage responsive indicator.

6. A passive infrared closure time computer as set forth in claim 5 wherein said means coupling a voltage responsive indicator to said differentiating network includes an amplifier between said chopping means and said detector.

7. A passive infrared closure time computer comprising, an infrared photoconductive cell having an alternating current impressed thereon for producing superimposed voltage signals upon receiving infrared radiations, an amplifier coupled to said cell for amplifying the carried voltage signal output of said cell, a detector connected to said amplifier for detecting said voltage signals, a logarithmic amplifier coupled to said detector for logarithmically amplifying said voltage signals, a differentiating network coupled to said logarithmic amplifier for differentiating the logarithmically amplified voltage signals of said cell, a circuit chopper in said network for interrupting the output of said differentiating network at a predetermined frequency, an amplifier coupled to said differentiating network for amplifying the interrupted voltage signals of said differentiating circuit, a peak detector coupled to said amplifier for detecting the positive peaks of the output of said differentiating network, and a voltage responsive indicator calibrated in seconds of time coupled to said peak detector whereby an infrared emitting source approaching said cell will produce a voltage signal at the output of said differentiating network inversely proportional to closure time, the closure time of which will be indicated by said indicator.

No references cited.